United States Patent [19]

Anderson et al.

[11] Patent Number: 4,511,692

[45] Date of Patent: Apr. 16, 1985

[54] CATIONIC ELECTRODEPOSITION COMPOSITION

[75] Inventors: Jeffrey L. Anderson, Coon Rapids; Philip J. Ruhoff; Robert B. Edenborg, both of Minneapolis, all of Minn.

[73] Assignee: The Valspar Corporation, Minneapolis, Minn.

[21] Appl. No.: 559,385

[22] Filed: Dec. 8, 1983

[51] Int. Cl.³ .......................... C09D 5/40; C09D 3/64; C09D 3/68

[52] U.S. Cl. .................... 525/7; 204/181 C; 524/901

[58] Field of Search ................. 204/181 C; 525/7; 524/901

[56] References Cited

U.S. PATENT DOCUMENTS

| | | | |
|---|---|---|---|
| 2,877,194 | 3/1959 | Kohen et al. | 523/513 |
| 3,455,857 | 7/1969 | Holzrichter | 528/75 |
| 3,634,351 | 1/1972 | Kimura et al. | 525/7 |
| 3,922,212 | 11/1975 | Gilchrist | 204/181 C |
| 3,939,051 | 2/1976 | Anderson et al. | 204/181 C |
| 4,147,675 | 4/1979 | Aritomi | 525/7 |
| 4,148,704 | 4/1979 | Tsou | 204/181 C |
| 4,155,824 | 5/1979 | Tsou | 204/181 C |
| 4,221,647 | 9/1980 | Turpin | 204/181 R |
| 4,246,087 | 6/1981 | Tsou et al. | 204/181 C |
| 4,263,194 | 4/1981 | Turpin | 204/181 C |
| 4,273,690 | 6/1981 | Walus | 525/7 |
| 4,278,575 | 7/1981 | Nakamura et al. | 525/7 |
| 4,308,121 | 12/1981 | Hazan | 204/181 C |
| 4,320,220 | 3/1982 | Pampouchidis | 204/181 C |
| 4,335,235 | 6/1982 | Chandler et al. | 528/397 |
| 4,337,187 | 6/1982 | Hazan | 524/504 |
| 4,338,235 | 7/1982 | Hazan | 524/504 |
| 4,442,247 | 4/1984 | Ishikura et al. | 524/901 |

*Primary Examiner*—Ronald W. Griffin
*Attorney, Agent, or Firm*—Schroeder, Siegfried, Vidas & Arrett

[57] ABSTRACT

A cationic electrodeposition composition comprising the reaction product of one or more base alkyds, containing unsaturation of the fatty acid chains to provide oxidative curing and one or more ethylenically unsaturated monomers, and one or more amine functional monomers, which are added to the base alkyd and polymerized. This composition provides a vehicle which is hydrolytically stable. Paints are prepared by the addition of conventional driers, pigments and solvents to the vehicle composition.

42 Claims, No Drawings

CATIONIC ELECTRODEPOSITION COMPOSITION

BACKGROUND OF THE PRIOR ART

Electrocoating compositions are well known and are disclosed in Gilchrist U.S. Pat. Nos. 3,351,675, 3,362,899, 3,575,909 and 3,351,575; in Turpin U.S. Pat. Nos. 4,221,647 and 4,263,194; and in Tsou U.S. Pat. Nos. 4,148,704, 4,155,824 and 4,246,087. Electrocoating compositions are dispersed in dilute water baths and then electrocoated onto cathodic or anodic substrates immersed in the electrocoating bath. The electrocoated films can be heat-cured with catalysts or cured by ultraviolet energy. Cationic electrodeposition coatings have superior durability as compared to anionic electrodeposition coatings.

In cathodic electrodeposition, the conductive metal substrate is the cathode in the electrical process, and an anode is placed in the electrodeposition bath with the electrodeposition coating being incorporated in the aqueous electrolyte between the anode and the cathode. After electrodeposition, the coating compositions must be cured. For example, in Tsou U.S. Pat. No. 4,148,704, the preferred curing is at a temperature ranging from about 250° F. to about 500° F. Air curing by virtue of the high concentration of unsaturated fatty acids is possible, but the corrosion resistance, weather durability and chalking resistance at low temperature curing are not as satisfactory.

Cathodic electrocoating systems that are based on alkaline cationic resins are solubilized or dispersed in water with the aid of an acid.

One of the major problems has been obtaining adequate cure at relatively low temperatures of 150°–175° C. or less. However, the high basicity of the previously known compositions results in poor low temperature cure.

Hazan, in U.S. Pat. No. 4,337,187 provided a hydrophilic polyamine copolymer backbone that wraps around a hydrophobic polyester or alkyd resin which is codispersed with the polyamine copolymer. A substantially neutral pH is thereby provided with a low amount of amine functionality.

BRIEF SUMMARY OF THE INVENTION

The present invention provides a novel cationic electrodeposition composition comprising an acrylated alkyd. Upon electrodeposition of the composition of this invention films are provided having desirable characteristics and at a significantly lower cure temperature than conventional electrodeposition systems.

The first of two steps in the composition manufacture is the preparation of the base alkyd. The base alkyd consists generally of fatty acids, polyols, polybasic acids, diacids and monoacids. The base alkyd is designed to have very good hydrolytic stability, functional groups (a grafting agent) which are capable of co-polymerizing with ethylenic unsaturated monomers and enough unsaturation of the fatty acid chains to ensure satisfactory oxidative cure of the final film.

Once the base alkyd is prepared, ethylenically unsaturated monomers, such as acrylates and vinyls, are reacted with it. Also, for functionality, amine functional monomers, such as dimethylaminoethyl acrylate, diethylaminoethyl acrylate, diethylaminoethyl methacrylate, tertiarybutylaminoethyl methacrylate, dimethylaminoethyl methacrylate and dimethylaminopropyl methacrylamide, are reacted along with the other monomers and the base alkyd. The amine functionality of the acrylic portion of the resultant resin provides water solubility and cationic functionality to the final resin when salted with an appropriate acid such as lactic, acetic, propionic or other similar, weak organic acids. The resultant resin or vehicle is prepared so as to have at least about 0.35 equivalents of amine groups per 1,000 grams of acrylated alkyd.

It has been found that the use of grafting agents such as conjugated fatty acids, in the alkyd preparation provides reaction sites for the later addition of acrylic monomers.

The grafting agents provide sites for copolymerization or "grafting" with the vinyl and acrylic monomers. Suitable grafting agents include unsaturated monoacids such as fatty acids, crotonic and sorbic acid. Ethylenically unsaturated isocyanates allow the attachment of acrylic functional groups to the alkyd. The use of isocyanates as grafting agents is shown in U.S. Pat. No. 3,455,857 to Holzrichter, incorporated herein by reference.

Additionally, ethylenically unsaturated diacids such as maleic and itaconic acids and anhydrides also provide suitable grafting agents as shown by Konen et al in U.S. Pat. No. 2,877,194 the disclosure of which is incorporated herein by reference. Also, tetrahydrophthalic acid and its anhydrides as described in Kimura, U.S. Pat. No. 3,634,351 may be utilized as grafting agents which allow the copolymerization of the alkyd to the monomers. The disclosure of Kimura, U.S. Pat. No. 3,634,351 is incorporated herein by reference.

"Tg", which refers to the glass transition state, is normally referred to as a measurement used for acrylic polymers. See Riddle, *Monomeric Acrylic Esters*, Reinhold Publishing Corp., reprint of Chapter I-IV, pp. 59–63. It has been found that the acrylated alkyd of the invention is optimized by developing a high Tg for the acrylic portion to provide stability and to enchance deposition. Electrodeposition should preferably be performed at a relatively high voltage, such as 125-300 volts, to provide a coating of sufficient thickness to provide good gloss and flow.

It has been found that alkyds with acid values between about 3 and 10 provide acrylated alkyds with good plating voltage, good gloss and good physical resistance properties. The alkyd is also designed to allow a relatively high Tg of the acrylic portion of the final composition.

The alkyd portion of the acrylated alkyd of the invention has good hydrolytic stability since the attached acrylic portion tends to wrap around the alkyd. The alkyd's ester bonds are protected from breakage by water due to the amine functional acrylic coating. The acrylated alkyd of the invention provides good low temperature, oxidative cure as opposed to the high temperatures required by Hazan.

Conventional free radical catalysts are used for the polymerization and include peroxides, azo catalysts and the like.

The resulting electrodeposition vehicle, i.e., the acrylated alkyd, is prepared for deposition in a known manner. This includes dispersing pigments in the resin, neutralizing the resin with an appropriate acid and reducing with water to about 6% to 20% solids. Driers, additional solvents, antioxidants and other additives may be included. A part or item to be coated functions as the cathode. An appropriate material is chosen as the anode and a unidirectional current is applied resulting in coating. The coating may be air dried but is preferably force-dried at approximately 200°–300° F., resulting in a finished film with excellent gloss, good durability, film toughness and film integrity as measured against water, unleaded gas and ethylene glycol immersion. However, the curing may be done at room temperature to 300° F. with good results. Energy requirements for the coating cure and substrate pretreatment are decreased with use of the low temperature cure cationic electrodeposition composition of the invention.

The acrylated alkyds of this invention may be advantageously coated onto surfaces pretreated with either zinc phosphate or iron phosphate pretreatment, although strictly speaking, pretreatment is not required.

DETAILED DESCRIPTION OF THE INVENTION

Alkyd Preparation

The alkyd of the invention will include polyhydric alcohols, polybasic acids, grafting agents, fatty acids and, optionally, a non-fatty monoacid.

Fatty acids, in which at least two percent of the fatty acid is unsaturated are added to a polyhydric alcohol, a polybasic acid, a grafting agent and, optionally, a non-fatty monoacid in a reaction vessel with an inert atmosphere. Other monoacids can also be included in the alkyd preparation as is generally known in the art. The presently preferred non-fatty monoacid is benzoic acid.

Suitable polyhydric alcohols for use in the alkyd preparation include those having at least two carbon atoms per molecule and also having two to six hydroxyl groups per molecule. Examples include glycerin, pentaerythritol, trimethylolpropane, trimethyl pentane diol, cyclohexane dimethylol, trimethylolethane, dipentaerythritol, ethylene glycol, propylene glycol, 1,3-butylene glycol, neopentyl glycol, hydrogenated bisphenol A, 2,2-dimethyl-3-hydroxypropyl-2,2-dimethyl-3-hydroxy propionate, dimethylolpropionic acid, and the like. Presently preferred polyhydric alcohols are pentaerythritol, trimethylolpropane, cyclohexane dimethylol and trimethylolethane.

Presently preferred fatty monobasic acids which have a high linoleic acid content include high purity tall oil fatty acids and soybean fatty acids.

The presently preferred grafting agents include fatty acids such as conjugated tall oil, like the conjugated fatty acid sold under the trademark PAMOLYN 380 by Hercules, Inc. (PAMOLYN 380 fatty acid has a high concentration of unsaturation at positions 9 and 11 of a C 18 fatty acid. It contains about 70% conjugated unsaturation of linoleic acid.), linseed fatty acid, dehydrated castor oil fatty acid and tung fatty acids. Also included are monoacids such as crotonic and sorbic acids, ethylenically unsaturated diacids such as maleic, itaconic and tetrahydrophthalic acid and anhydrides and ethylenically unsaturated isocyanates such as isocyanatoethyl methacrylate.

Suitable polybasic acids include saturated and aromatically unsaturated acids and anhydrides with at least two carboxyl groups per molecule. Examples include malonic, glutaric, pimelic, suberic, azelaic, sebacic, succinic, adipic, phthalic, isophthalic, terephthalic, tricarboxylic lower alkyl phthalic and hexahydrophthalic acids and trimellitic anhydride, 3,3,4,4-benzophenone tetracarboxylic acid dianhydride and dimerized fatty acids. Presently preferred polybasic acids include adipic, terephthalic, phthalic and isophthalic acid.

The base alkyd includes, by weight, from about 5 up to about 60% polybasic acid, from about 5 up to about 60% polyhydric alcohol, about 10–90% monobasic fatty acid and from 0.5 up to about 60% grafting agent and, optionally, from about 0–50% non-fatty monoacid.

Most preferably, the base alkyd includes by weight, from about 15 to about 30% polybasic acid, from about 15 to about 30% polyhydric alcohol, from about 40–75% monobasic fatty acid and from about 2 to about 10% grafting agent.

The mixture is heated to about 460° F. as water of esterification is removed as is commonly accepted practice in alkyd manufacture. Once an acid value of approximately 10 is reached, the reaction is cooled and the appropriate solvent added for viscosity control.

Acrylation of Base Alkyd

The base alkyd described hereinabove and an optional solvent, which is preferably of the glycol ether type, are heated to about 200°–300° F. under an inert atmosphere.

Ethylenically unsaturated monomers are fed into the mixture over a 2–3 hour period. Also, a free radical catalyst is added at the same time to initiate addition polymerization. Examples of suitable ethylenically unsaturated monomers include styrene, methylmethacrylate, butyl methacrylate, butyl acrylate, lauryl methacrylate, and the like. Presently preferred ethylenically unsaturated monomers include styrene, methyl methacrylate, butyl methacrylate. Dimethylaminoethyl methacrylate and acrylate, tertiarybutylaminoethyl methacrylate and dimethylaminopropyl methacrylamide are amine functional ethylenically unsaturated monomers which are preferred. Catalysts such as 2,2-azobisisobutyronitrile, dicumyl peroxide, and the like are preferred.

After all the monomer and catalyst are added, the mixture is held for several hours with one or two additional adds of catalyst. The reaction is held at temperature until the theoretical non-volatile is reached as is common in addition polymerization.

SPECIFIC EXAMPLES

The components of the base composition are generally present in the following ranges in the preferred and most preferred embodiments.

TABLE I

| | Percent by Weight (total 100%) | |
|---|---|---|
| Components | Preferred | Most Preferred |
| Alkyd | 10–90 | 20–70 |
| Acrylic | 10–90 | 80–30 |

TABLE II

| | Percent by Weight of the Alkyd (total 100%) | |
|---|---|---|
| Components Alkyd Generic: | Preferred | Most Preferred |
| Polybasic acid | 5 to 60 | 15–30 |
| Polyhydric alcohol | 5 to 60 | 15–30 |
| Fatty acid | 10–90 | 40–75 |
| Grafting agent | 0.5 to 60 | 2–10 |
| Non-fatty monobasic acid | 0–50 | 5–35 |

TABLE III

| Ethylenically unsaturated Monomers-Generic | Percent by Weight of the ethylenically unsaturated monomers (total 100%) | |
|---|---|---|
| | Preferred | Most Preferred |
| Acrylic or methacrylic | 0 to 95 | 10-80 |
| Vinyl | 0 to 95 | 10-80 |
| Amine functional | 5-95 | 5-45 |

TABLE IV

| Components | Preferred | Most Preferred |
|---|---|---|
| Alkyd-Specific | Percent by Weight of the Alkyd (total 100%) | |
| Isophthalic acid | 5 to 60 | 15-30 |
| Pentaerythritol | 5 to 60 | 15-30 |
| Unsaturated fatty acid | 10-90 | 40-75 |
| Grafting agent | 0.5-60 | 2-10 |
| Benzoic acid | 0-50 | 5-35 |
| Ethylenically unsaturated Monomers-Specific | Percent by Weight of the ethylenically unsaturated monomers (total 100%) | |
| Methyl Methacrylate | 0 to 95 | 10-80 |
| Styrene | 0 to 95 | 10-80 |
| Dimethylaminoethyl Methacrylate | 5-95 | 5-45 |

BASE ALKYD PREPARATION

Example I

Into a container equipped with a thermometer, stirrer, and reflux condenser was placed 6080 grams of a high purity vegetable oil fatty acid, such as the fatty acid sold under the mark SYLFAT V-18 by Glidden-Durkee, a division of SCM Corporation of Jacksonville, Fla., 6074 grams of benzoic acid, 5155 grams of technical grade pentaerythritol and 3933 grams of isophthalic acid under a nitrogen environment. The mixture was heated to about 300° F. (149° C.) and 21.0 grams of FASCAT 4201 brand catalyst was added. Heating continues and at 335° F. (168° C.) and 100 grams of xylene was added. One hour and 45 minutes later, additional xylene was added to a total of 210 grams.

At 440° F. (227° C.), 1400 grams of water had been removed. At 445° F. (279° C.) the reaction mass was clear coming from the container but hazes when xylene added. The acid value was 56.7 and 1725 grams of water had been removed.

After five hours, the temperature reached 475° F. (246° C.) and the acid value dropped to 9.0, the Gardner viscosity when cut to 70% solids with xylene was X-Y. The removed water weight was about 2000 grams.

4421 grams of SYLFAT V-18, brand high purity vegetable oil fatty acid with 2333 grams of a conjugated fatty acid, sold by Hercules, Inc., of Wilmington, Del., under the mark PAMOLYN 380, was added.

At 9 hours, with the temperature up to 440° F. (227° C.), 7.0 grams of FASCAT 4201 brand catalyst was added. The acid value was 26.8 with a Gardner-Holt viscosity of F in a 70% solids in xylene.

At 9 hours 25 minutes, 290 grams of xylene was added to a total of 400 grams, since 100 grams were drained off earlier. A sample taken from the batch at 480° F. (249° C.) had an acid value of 22.1 and a viscosity of F in 70% solids in xylene. Another 300 grams of xylene was added, with the head temperature at 180° F. (82° C.), to a total of 700 grams.

A sample taken at 10 hours had an acid value of 17.7 and viscosity of G in 70% solids in xylene. After another 30 minutes, the acid value dropped to 13.5, with the viscosity still at G.

Another 100 grams xylene were added, and a sample at 11 hours had an acid value of 11.4 and a viscosity of G. The temperature was raised to 485° F. (252° C.). The acid value dropped to 9.8.

At twelve hours, the reaction mass was cooled. At 220° F. (104° C.), 3,687 grams of propyl ether of propylene glycol was added, and the product was filtered.

The alkyd composition had a viscosity at 70% solids in propyl ether of propylene glycol of M, an acid value of 8.9, non-volatile solids of 83.9 and a color at 70% solids in propyl ether of propylene glycol of 9 on the Gardner-Holt scale.

Example II

| | Parts by Weight |
|---|---|
| Portion I | |
| Pamolyn 380 brand fatty acid | 254 |
| Emersol 315 brand fatty acid | 1137 |
| Benzoic acid | 885 |
| Isophthalic acid | 746 |
| Pentaerythritol | 850 |
| Portion II | |
| Fascat 4201 brand catalyst | 3.8 |
| Portion III | |
| Xylene | 80 |
| Portion IV | |
| Propyl ether of propylene glycol | 794 |

Portion I is charged into a reaction vessel equipped as in Example I and heated to about 250° F. Portion II is added and heat is applied and portion III is added as an azeotrope at a rate which water removal permits to about 460° F. The reaction continues until an acid value of about 5 to 7 and a viscosity of about X to Y on the Gardner scale is obtained with a sample cut to about 70% solids with xylene. The alkyd is cooled, and portion IV is added when the temperature drops below about 300° F.

Example III

| Portion I | Parts by Weight |
|---|---|
| Soybean fatty acid | 1268 |
| Pamolyn 380 brand fatty acid | 210 |
| Trimethylol ethane | 856 |
| Isophthalic acid | 896 |
| Benzoic acid | 269 |

Portion I is charged into a reactor equipped for fusion and heat is applied to a peak of about 480° F. as water removal permits. The reaction is run at about 480° F. until an acid value of 5 or less is reached.

Example IV

| Portion I | Parts by Weight |
|---|---|
| Sylfat V-18 vegetable fatty acid | 1230 |
| Isophthalic acid | 746 |
| Benzoic acid | 700 |
| Pentaerythritol | 856 |
| Fascat 4201 brand catalyst | 3.6 |

Portion I is charged into a reactor vessel equipped for fusion and heat is applied to a peak of about 480° F. as water removal permits. The reaction is run at about 480° F. until an acid value of 5 or less is reached.

ACRYLATION OF BASE ALKYD

Example V 1489 grams of base alkyd prepared from Example I were charged with 281 grams of propyl ether of propylene glycol and heated to 210° F. in a nitrogen atmosphere. A total of 250 grams of styrene, 505 grams of methyl methacrylate, 250 grams of butyl methacrylate, 245 grams of dimethylaminoethyl methacrylate and 35 grams of the polymerization initiator sold under the mark VAZO-64 by E. I. du Pont de Nemours and Company were continuously fed in and mixed over about a two hour and forty minute period, while maintaining the temperature at about 210° F. Another acceptable addition procedure would be to add one quarter of the monomer each forty minutes. A total of 110 grams of diethylene glycol dimethyl ether and an additional 9.5 grams of VAZO-64 initiator were mixed. One half was added one hour after the monomer catalyst addition and the other half was added an hour later.

After mixing about one more hour at about 200° to 210° F., the viscosity of a sample diluted to about 70% solids with propyl ether of propylene glycol was 111 stokes. The non-volatile material level of the acrylated alkyd was 67.7%, compared to a theoretical 70.0%.

Example VI

|  | Parts by Weight |
| --- | --- |
| Portion I | |
| Propyl ethyl of propylene glycol | 604 |
| Portion II | |
| Methyl Methacrylate | 555 |
| Styrene | 200 |
| Dimethylaminoethyl Methacrylate | 245 |
| Vazo 67 brand polymerization initiator | 32.2 |
| Alkyd prepared by Example II | 1875 |
| Portion III | |
| Propyl ether of propylene glycol | 40 |
| Portion IV | |
| DiCup R brand catalyst | 30 |
| Propyl ether of propylene glycol | 100 |

Portion I is charged into a reactor and heated to about 200° F. under an inert atmosphere. Portion II is added (with 10% initially) incrementally over the next two hours and 55 minutes at 200° F. Portion III is then used to flush any pumping lines and the batch is held for one hour at 200° F. One-half of Portion IV is added and the temperature is raised to about 280° F. over 30 minutes. The batch is held one hour and the remainder of Portion IV is added, and held at two hours before cooling.

Example VII

|  | Parts by Weight |
| --- | --- |
| Portion I | |
| Alkyd prepared by Example III | 600 |
| Ethylene glycol monobutylether | 212 |
| Portion II | |
| Methyl Methacrylate | 284 |
| t-Butylaminoethyl Methacrylate | 116 |
| Dicumyl peroxide | 12 |
| Portion III | |
| Ethylene glycol monobutylether | 40 |

| -continued | |
| --- | --- |
|  | Parts by Weight |
| Dicumyl peroxide | 4 |

Portion I is charged into a reactor and heated to about 290° F. Portion II is then blended into a uniform mixture and one-quarter of the mix is added to the reactor and held at about 290° F. for 30 minutes. The mix of Portion II is added by quarters as above at 290° F. One hour after the last aliquot of Portion II has been added, one-half of a mixture of Portion III is added and held for one hour. The remainder of Portion III is then added and held for 2 hours. The acrylated alkyd composition is then cooled and filtered.

Example VIII

|  | Parts by Weight |
| --- | --- |
| Portion I | |
| Alkyd prepared by Example IV | 515 |
| Dibutyltin dilaurate | 0.5 |
| Portion II | |
| Isocyanatoethylmethacrylate | 12.5 |
| Diethylene glycol dimethyl ether | 15.2 |
| Portion III | |
| Ethylene glycol monobutyl ether | 220 |
| Portion IV | |
| Methyl methacrylate | 200 |
| Styrene | 100 |
| Butyl methacrylate | 90 |
| Dimethylamino ethyl methacrylate | 98 |
| Vazo 64 brand polymerization initiator | 14 |
| Portion V | |
| Vazo 64 brand polymerization initiator | 4 |
| Ethylene glycol monobutyl ether | 50 |

Portion I is charged in a reactor and heated to about 75° C. A mixture of Portion II is added over 30 minutes and then held for 30 minutes at 75° C. Portion III is added and the temperature is raised to about 93° C. The mixture of Portion IV is then added to the reactor, 10% intially being added. After 15 minutes, the rest of Portion IV is added to the reactor over 150 minutes in about 10% aliquots. After 60 minutes from the last aliquot, one-half of Portion V is added. The remainder of Portion V is added after another 60 minutes and the batch is held for about 120 minutes at 93° C. The resultant acrylated alkyd composition had 74.5% non-volatile materials. A sample adjusted to 70% solids with the addition of ethylene glycol monobutyl ether had a viscosity of 250 stokes.

Example IX

|  | Parts by Weight |
| --- | --- |
| Portion I | |
| Alkyd prepared by Example IV | 3181 |
| Sorbic Acid | 34 |
| Xylene | 120 |
| Portion II | |
| Propyl ether of propylene glycol | 2064 |
| Portion III | |
| Methyl Methacrylate | 1189.6 |
| Styrene | 428.7 |
| Dimethylaminoethyl methacrylate | 525.1 |
| Dicumyl peroxide | 64.3 |
| Portion IV | |
| Propyl ether of propylene glycol | 171.5 |

| -continued | |
|---|---|
| | Parts by Weight |
| Dicumyl peroxide | 17.1 |

Portion I is charged into a reactor and heated to about 400° F. in an inert atmosphere. The batch is held at about 400°–420° F. using a xylene reflux to remove water until the acid value drops to the value the base alkyd had initially. The batch is allowed to cool to about 280° F. Portion II is then added and the temperature is raised to 290° F. Initially, 10% of a mixture of Portion III is added to the reactor and held 15 minutes. The remainder of Portion III is added in roughly equal increments over 120 minutes. After the monomers have all been added for 60 minutes, one-half of Portion IV is added. The remainder Portion IV is added after one hour and the batch is held for about 120 minutes. The acrylated alkyd is then cooled and filtered. The composition had a 68% non-volatile material content and a viscosity of 100 stokes when adjusted to 65% solids with propyl ether of propylene glycol.

PAINT PREPARATION

Paints for cationic electrodeposition are prepared in a conventional manner by adding pigments, solvents and/or driers to the electrodeposition vehicle of this invention, as desired. The paint is then electroplated from a tank with the acrylated alkyd and an organic acid such as propionic acid. A one mil coating is developed when electroplated at 125 volts at ambient temperature for about two minutes. Examples of paint compositions using the base compositions of the invention are described below.

Example X

| | Parts by Weight |
|---|---|
| Portion I - Electrodeposition Vehicle | |
| Acrylated alkyd from Example VII | 179.4 |
| Phthalo Green | 4.52 |
| Yellow iron oxide | 16.62 |
| Ciba 2 GLTE | 1.41 |
| Ethylene glycol monohexylether | 17.0 |
| Ethylene glycol monobutylether | 2.1 |
| Portion II - Pigments, solvents, etc. | |
| Lactic acid (80%) | 8.9 |
| 12% Cobalt naphthenate drier | 1.0 |
| Methyl ethyl ketoxime | 1.0 |
| Portion III | |
| Deionized water | 1468.05 |

Portion I is charged into a conventional sand mill and is milled to about a 7+ Hegman. The components of Portion II are added to the resultant paste in order and mixed. Portion III is then added. The paint has a solids content of about 10%, a pH of 4.9 and conductivity of 900 umhos. A Bonderite 1000 brand panel from Hooker Chemical Corp. of Detroit, Mich. plated for two minutes at 150 volts gave a 1.0 mil film. After force drying for 45 minutes at 200° F., a gloss reading of 90/75 at 60°/20° meters on a Hunter D48D gloss meter was obtained.

Example XI

| | Parts by Weight |
|---|---|
| Portion I - Electrodeposition Vehicle | |

| -continued | |
|---|---|
| | Parts by Weight |
| Acrylated alkyd from Example VIII | 112.2 |
| Ethylene glycol monobutyl ether | 1.9 |
| Ethylene glycol monohexyl ether | 10.0 |
| Titanium oxide (rutile) | 16.7 |
| Portion II - Pigments, solvents, etc. | |
| Lactic acid (80%) | 5.3 |
| 12% Cobalt naphthenate drier | 0.5 |
| Methylethyl ketoxime | 1.0 |
| Portion III | |
| Deionized water | 854 |

Portion I is sandmilled at high speed to a value of about 7½+ Hegman. Portion II is mixed into the dispersion and water from Portion III is added resulting in a paint with 10% solids, pH 4.7 and a conductivity of 720 umhos. Plating at 150–200 volts produced 1 mil film. After force drying for 30 minutes at 250° F., a hard, smooth coating is produced. Reflection is greater than 80% on the 60° Hunter D48D gloss meter.

Example XII

| | Parts by Weight |
|---|---|
| Portion I | |
| Alkyd from Example II | 8.85 |
| 2-ethyl hexyl alcohol | 3.20 |
| Titanium dioxide (rutile) | 28.35 |
| Portion II | |
| Acrylated alkyd from Example VI | 195.9 |
| 2-ethyl hexyl alcohol | 10.9 |
| Propionic acid | 5.6 |
| Manganese drier 5% | 2.5 |
| Activ 8 brand drier promoter from Vanderbilt Chemical Co. | 0.37 |
| Ortho-t-butyl phenol | 0.57 |
| Deionized water | 1443.76 |

This paint is mixed and milled as above. The paint had a conductivity of 800 umhos and a pH of 4.5 at 10% solids. Plating at 140 volts of direct current produced a one mil film. The coated Bonderite 1000 brand panel from Hooker Chemical Corp. of Detroit, Mich. was then cured at 200° F. for 45 minutes. The finished coating had a gloss of 94 on the 60° Hunter D48D gloss meter.

In considering the invention, it should be remembered that the present disclosure including the preferred embodiments is illustrative only, and that the scope of the invention should be determined by the appended claims.

What is claimed is:

1. A cationic electrodeposition coating composition comprising:

a reaction product of a base alkyd and ethylenically unsaturated momomers at least some of which are amine functional monomers, said base alkyd comprising the reaction product of a polyhydric alcohol, a polybasic acid, a fatty acid, and a grafting agent; and said product including amine functional groups in a quantity to provide a water dispersible and cationically depositable composition.

2. The electrodeposition composition of claim 1 including a non-fatty monoacid in the base alkyd.

3. The electrodeposition composition of claim 1 including pigments, solvents and driers to form a paint composition for electrodeposition.

4. An acrylated alkyd electrodeposition composition comprising:
   a reaction product of a base alkyd with ethylenically unsaturated monomers at least some of which are amine functional monomers;
   said base alkyl comprising the polymeric reaction product of a polyhydric alcohol, a polybasic acid, fatty acid and a grafting agent which may be a functional group attached to any of the above constituents or as a separate additional constituent; and
   said product being a copolymer including amino groups in a quantity to provide a water dispersible and cationically depositable composition.

5. The acrylated alkyd electrodeposition composition of claim 4 wherein said amine functional monomers are selected from the group consisting of dimethylaminoethyl methacrylate, dimethylaminopropyl methacrylamide, tertiarybutylaminoethyl methacrylate, dimethylaminoethyl acrylate, diethylaminoethyl methacrylate and diethylaminoethyl acrylate.

6. An acrylated alkyd electrodeposition coating composition comprising:
   a base alkyd to which ethylenically unsaturated monomers, at least one of which is an amine functional monomer, are attached through a grafting agent selected from the group consisting of ethylenically unsaturated monoacids, ethylenically unsaturated isocyanates, ethylenically unsaturated diacids and their anhydrides and mixtures thereof; and
   said amine functional groups being in a quantity to provide a water dispersible and cationically depositable composition.

7. The composition of claim 6 wherein the grafting agent is selected from the group consisting of fatty acids, conjugated fatty acids, sorbic acid, crotonic acid, isocyanatoethyl methacrylate, maleic acid, itaconic acid and tetrahydrophthalic acid and their anhydrides, and mixtures thereof.

8. An acrylated alkyd electrodeposition composition comprising:
   the water dispersible reaction product of an alkyd with ethylenically unsaturated monomers including at least some amine functional monomer, said acrylated alkyd containing, on a 100 weight percent total weight basis about:
   (a) 10–90% alkyd; said alkyd comprising the reaction product of a fatty acid, polyhydric alcohol, polybasic acid and grafting agent; said fatty acid having at least 2% unsaturation;
   (b) the balance being ethylenically unsaturated monomers and of which 5–95% are amine functional monomer; and
   (c) said acrylated alkyd containing at least about 0.35 equivalents of amine groups per 1,000 grams of acrylated alkyd so as to provide a cationically depositable composition.

9. The acrylated alkyd of claim 8 wherein said alkyd includes a non-fatty monobasic acid.

10. An acrylated alkyd water dispersible electrodeposition composition for an electrodeposition coating comprising on a 100 weight percent total weight basis:
    (a) 10–90% alkyd; said alkyd comprising the reaction product of a polyhydric alcohol, polybasic acid, grafting agent and fatty acid, said fatty acid having at least 2% unsaturation;
    (b) the balance being ethylenically unsaturated monomers, said monomers including ethylenically unsaturated monomers of which 5–95% are amine functional monomer so as to provide a water dispersible and cationically depositable composition; and
    (c) said monomers being attached to said grafting agents with the use of a polymerization intiator.

11. The acrylated alkyd composition of claim 10 wherein said alkyd includes a non-fatty monobasic acid.

12. The acrylated alkyd electrodeposition composition of claim 10 wherein said amine functional monomers are selected from the group consisting of dimethylaminoethyl methacrylate, dimethylaminopropyl methacrylamide, tertiarybutylaminoethyl methacrylate, dimenthylaminoethyl acrylate, diethylaminoethyl methacrylate and diethylaminoethyl acrylate.

13. The electrodeposition composition of claim 12 wherein said acrylated alkyd comprises, on a 100 weight percent total weight basis about:
    (a) 20–70% alkyd; and
    (b) 30–80% ethylenically unsaturated monomers.

14. The electrodeposition composition of claim 13 wherein said alkyd comprises, on a 100 weight percent total weight basis about:
    (a) 15–30% polybasic acid;
    (b) 15–30% polyhydric alcohol;
    (c) 5–35% benzoic acid;
    (d) 40–75% fatty acid; and
    (e) 2–10% grafting agent.

15. The electrodeposition composition of claim 13 wherein said ethylenically unsaturated monomers comprise, on a 100 weight percent total weight basis of the unsaturated monomers about 5–45% amine functional monomer.

16. The electrodeposition composition of claim 12 wherein said alkyd comprises, on a 100 weight percent total weight basis about:
    (a) 5 to 60% polybasic acid;
    (b) 5 to 60% polyhydric alcohol;
    (c) 0.5 to 60% grafting agent; and
    (d) about 10–90% fatty acid.

17. The electrodeposition composition of claim 16 wherein said grafting agent is a conjugated fatty acid.

18. The electrodeposition composition of claim 16 wherein said polybasic acid is isophthalic or phthalic acid.

19. The electrodeposition composition of claim 18 wherein said polyhydric alcohol is selected from the group consisting of pentaerythritol, trimethylolpropane, trimethylolethane and cyclohexane dimethylol.

20. The electrodeposition composition of claim 19 wherein said fatty acid is selected from the group consisting of soybean fatty acids and tall oil fatty acids.

21. The electrodeposition composition of claim 12 wherein said acrylated alkyd contains at least about 0.35 equivalents of amine groups per 1,000 grams of acrylated alkyd.

22. The electrodeposition composition of claim 10 wherein said grafting agents are selected from the group consisting of conjugated fatty acids, isocyanatoethyl methacrylate and sorbic acid.

23. A paint composition for cationic electrodeposition comprising the electrodeposition composition of claim 10, pigments, driers and weak organic acids.

24. The paint composition of claim 23 wherein said weak organic acid is selected from the group of propionic and lactic acids.

25. A cationic electrodeposition coating vehicle comprising the reaction product of:
    (a) a base alkyd, including a grafting agent; and (b) ethylenically unsaturated monomers, at least one of which includes an amine functional monomer, said amine functional groups in a quantity to provide a water dispersible and cationically electrodepositable composition.

26. The electrodeposition vehicle of claim 25 wherein said alkyd comprises, on a 100 weight percent total weight basis:
   (a) 5 to 60% polybasic acid;
   (b) 5 to 60% polyhydric alcohol;
   (c) 0.5 to 60% grafting agent;
   (d) about 10–90% fatty acid, said fatty acid fatty acid having at least 2% unsaturation; and
   (e) about 0–50% non-fatty monobasic acid.

27. The electrodeposition vehicle of claim 26 wherein said alkyd comprises, on a 100 weight percent total weight basis:
   (a) about 15–30% polybasic acid;
   (b) about 15–30% polyhydric alcohol;
   (c) about 5–35% benzoic acid;
   (d) about 40–75% fatty acid; and
   (e) about 2–10% grafting agent.

28. The electrodeposition vehicle of claim 26 wherein said polybasic acid is isophthalic or phthalic acid.

29. The electrodeposition vehicle of claim 26 wherein said polyhydric alcohol is selected from the group consisting of pentaerythritol, trimethylolpropane, trimethylolethane and cyclohexane dimethylol.

30. The electrodeposition vehicle of claim 26 wherein said grating agent is selected from the group consisting of ethylenically unsaturated monoacids, ethylenically unsaturated isocyanates, ethylenically unsaturated diacids and their anhydrides and mixtures thereof.

31. The composition of claim 30 wherein the grafting agent is selected from the group consisting of fatty acids, conjugated fatty acids, sorbic acid, crotonic acid, isocyanatoethyl methacrylate maleic acid, itaconic acid and tetrahydrophthalic acid and their anhydrideds, and mixtures thereof.

32. The electrodeposition vehicle of claim 26 wherein said fatty acid is selected from the group consisting of soybean and tall oil fatty acids.

33. The electrodeposition vehicle of claim 25 wherein said amine functional monomers are selected from the group consisting of dimethylaminoethyl methacrylate, dimethylaminopropyl methacrylamide, tertiarybutylaminoethyl methacrylate, dimethylaminoethyl acrylate, diethylaminoethyl methacrylate and diethylaminoethyl acrylate.

34. The electrodeposition vehicle of claim 32 wherein said composition comprises, on a 100 weight percent total weight basis about:
   (a) 20–70% alkyd; and
   (b) 30–80% total ethylenically unsaturated monomers, about 5 to 95% of said monomers including amine functional monomers.

35. The electrodeposition vehicle of claim 34 wherein said amine functional monomers comprise on a 100 weight percent total weight basis of monomers about 5 to 45% amine functional monomers.

36. The electrodeposition vehicle of claim 34 wherein said alkyd comprises on a 100 weight percent total weight basis about:
   (a) 15–30% polybasic acid;
   (b) 15–30% polyhydric alcohol;
   (c) 2–10% grafting agent; and
   (d) 40–75% fatty acid, said fatty acid having at least 2% saturation.

37. The process for forming a water dispersible cationic electrode-position vehicle comprising:
   (a) reacting a polyhydric alcohol, polybasic acid, fatty acid and a grafting agent together to form a base alkyd; and
   (b) copolymerizing said base alkyd with ethylenically unsaturated monomers at least one of which is an amine functional monomer.

38. The process of claim 37 wherein said base alkyd includes the addition of non-fatty monobasic acid.

39. The process of claim 37 wherein said grafting agent is selected from the group consisting of conjugated fatty acids having at least 2% unsaturation, sorbic, crotonic, maleic, itaconic, tetrahydrophthalic acids and anhydrides and ethylenically unsaturated isocyanates.

40. An acrylated alkyd graft copolymer electrodeposition composition in which the acrylic portion contains amine functionality providing water dispersibility and cationic functionality.

41. The composition of claim 40 wherein said alkyd portion comprises the reaction product of a polyhydric alcohol, a polybasic acid, a fatty acid and a grafting agent.

42. The composition of claim 40 wherein the amount of amine functionality is at least 0.35 equivalents per 1000 grams of the graft copolymer.

* * * * *